United States Patent
Sannelius et al.

(10) Patent No.: US 10,066,685 B2
(45) Date of Patent: Sep. 4, 2018

(54) HYDRODYNAMIC RETARDER DEVICE, METHOD FOR ITS USE TOGETHER WITH A VEHICLE

(71) Applicant: SCANIA CV AB, Södertälje (SE)

(72) Inventors: Mikael Sannelius, Älvsjö (SE); Johnny Färm, Hägersten (SE); Petter Ryback, Södertälje (SE); Elias Bartos, Stockholm (SE)

(73) Assignee: Scania CV AB, Södertälje (SE)

( * ) Notice: Subject to any disclaimer, the term of this patent is extended or adjusted under 35 U.S.C. 154(b) by 227 days.

(21) Appl. No.: 14/914,526

(22) PCT Filed: Sep. 10, 2014

(86) PCT No.: PCT/SE2014/051038
§ 371 (c)(1),
(2) Date: Feb. 25, 2016

(87) PCT Pub. No.: WO2015/038052
PCT Pub. Date: Mar. 19, 2015

(65) Prior Publication Data
US 2016/0200302 A1   Jul. 14, 2016

(30) Foreign Application Priority Data

Sep. 12, 2013 (SE) ..................... 1351050

(51) Int. Cl.
*F16D 57/04* (2006.01)
*B60T 1/087* (2006.01)
(Continued)

(52) U.S. Cl.
CPC .............. *F16D 57/04* (2013.01); *B60T 1/062* (2013.01); *B60T 1/087* (2013.01); *B60T 10/02* (2013.01)

(58) Field of Classification Search
CPC .......... F16D 57/04; B60T 1/062; B60T 1/087; B60T 10/02
(Continued)

(56) References Cited

U.S. PATENT DOCUMENTS 4,175,647 A * 11/1979 Hanke .................... B60T 1/087
                                                    188/264 B
4,538,553 A   9/1985 Kurz et al.
(Continued)

FOREIGN PATENT DOCUMENTS

EP       1251050 A2    10/2002
GB       1189535 A *    4/1970  .............. B60T 1/087
(Continued)

OTHER PUBLICATIONS

International Search Report for PCT/SE2014/051038 dated Dec. 17, 2014.

*Primary Examiner* — Richard M Lorence
(74) *Attorney, Agent, or Firm* — Moore & Van Allen PLLC; W. Kevin Ransom

(57) ABSTRACT

A hydrodynamic retarder device for installation in a driveline to a vehicle, wherein the retarder device comprises: a blade-equipped stator which, together with a blade-equipped rotor, forms a blade system with a workspace for receipt of an aqueous working medium, and a retarder circuit connected to the workspace to control the inflow of a working medium to the workspace, wherein the retarder circuit is installed to be connected to the vehicle's ordinary cooling water circuit. The retarder circuit comprises valve elements to shut off the flow of working medium to the workspace, and a negative pressure generator is connected in the retarder circuit, which is installed to reduce the pressure in the workspace to or below the vapor pressure for the working medium, so that the workspace is thus evacuated of
(Continued)

the liquid working medium. The invention also pertains to a method and a vehicle.

20 Claims, 3 Drawing Sheets

(51) Int. Cl.
*B60T 10/02* (2006.01)
*B60T 1/06* (2006.01)

(58) Field of Classification Search
USPC .......................................................... 192/216
See application file for complete search history.

(56) References Cited

U.S. PATENT DOCUMENTS 5,779,008 A * 7/1998 Vogelsang ................ B60T 1/08
188/296
2005/0269177 A1 12/2005 Vogelsang et al.

FOREIGN PATENT DOCUMENTS

| WO | 2011107240 A1 | 9/2011 |
| WO | WO-2011/107240 A1 | 9/2011 |

* cited by examiner

HYDRODYNAMIC RETARDER DEVICE, METHOD FOR ITS USE TOGETHER WITH A VEHICLE

CROSS-REFERENCE TO RELATED APPLICATIONS

This application is a national stage application (filed under 35 § U.S.C. 371) of PCT/SE2014/051038, filed Sep. 10, 2014 of the same title, which, in turn, claims priority to Swedish Application No. 1351050-8, filed Sep. 12, 2013 of the same title; the contents of each of which are hereby incorporated by reference.

FIELD OF THE INVENTION

The present invention pertains to a hydrodynamic retarder device for a vehicle comprising at least one blade head stator in order to, jointly with at least one blade head rotor, form a blade system with a workspace for reception of an aqueous working medium, and a retarder circuit connected to the workspace in order to control the supply of the working medium to the workspace. The invention also pertains to a method for operation of a hydrodynamic retarder device and a vehicle equipped with a hydrodynamic retarder device.

BACKGROUND OF THE INVENTION

In order to increase the driving efficiency and safety and to reduce wear of the wheel brakes, primarily heavy goods vehicles are, according to prior art, equipped with retarder devices. A retarder device is a hydrodynamic auxiliary brake that brakes the car's driveline with the help of resistance exercised by a blade system, which impels an amount of liquid in a workspace. Braking energy absorbed by the retarder device transitions in operation into heat energy in the liquid, which in turn is cooled down by a cooling system in the vehicle.

The braking torque is controlled through control of a pressure prevailing in the workspace between the blades belonging partly to the retarder device's stator, and partly to its rotor. When the retarder device is not used, the workspace is essentially depressurized. However, a certain drag loss is created in the retarder device since it still rotates with the driveline. From a fuel-saving perspective it is important to keep this drag loss as small as possible.

A method to avoid the drag loss is to mechanically disconnect the retarder device from the driveline when it is not used. This is possible with the help of a coupling, such as a synchromesh or a disc clutch. When the retarder device is then to be connected to be used for braking, the retarder device's rotor must be accelerated quickly and synchronized with the driveline's engine speed. This must happen within fractions of a second, and the acceleration torque produced must be minimized in order to avoid uncomfortable jerks to be generated in the vehicle.

In a retarder device, which uses oil as a working medium, this is fully possible thanks to a low acceleration resistance, which is achieved since the blade system is filled with air instead of oil during this acceleration phase.

In order to minimize minimise the number of components and systems in the vehicle, it is advantageous if the vehicle's ordinary coolant, which typically contains a mixtures of water and glycol, may be used as a working medium. A retarder device applying this principle is called a water decelerator.

In a water retarder, however, it is problematic to aerate the blade system during acceleration, since air that comes into contact with the coolant may partly follow the latter and have an adverse impact on other components in the vehicle with which the coolant comes into contact. For this reason, partly water-filled water retarders are operated also when they are disconnected, entailing a relatively high acceleration torque.

For this reason, more complex connecting components are required and uncomfortable jerks may nevertheless to some extent still arise in the vehicle at connection.

As examples of the technology's background, U.S. Pat. No. 2,287,130, US20060909971, WO2010034493, US2007102251 and DE10054078 may be mentioned.

SUMMARY OF THE INVENTION

It is an objective of the present invention to provide a hydrodynamic retarder device according to above, and a method at which the problems with the background technology are addressed and at least alleviated. This is achieved at a device according to the invention since the retarder circuit comprises valve elements to shut off the flow of working medium to the workspace, and since a negative pressure generator is connected in the retarder circuit installed to reduce the pressure in the workspace to or below the vapor pressure for the working medium, so that the workspace is thus evacuated of the liquid working medium.

By essentially momentarily reducing the pressure in the retarder device before connection with the driveline and the associated acceleration phase, water in the retarder device will quickly transform into steam and be evacuated. Thus, the retarder device's acceleration torque at the connection is very quickly reduced in order to be level with the corresponding acceleration torque for an oil retarder device. Herein, the duration of the pressure reduction for evacuation of the retarder device should be briefer than 0.5 seconds in order for the retarder device to be used without any substantial delay. More preferably, the duration of the pressure reduction for evacuation is below 0.3 seconds and most preferably, the duration of the pressure reduction for evacuation is below 0.2 seconds.

Steam is formed because in the enclosed workspace, defined by the stator and the rotor, the pressure is reduced almost instantly to the vapor pressure or to a pressure below the vapor pressure. Thus the blade space is evacuated quickly, almost instantly, and efficiently of liquid water and coolant, and mechanical connectivity/disconnectivity of the retarder device is made possible with maintained comfort and with the use of a clutch device comprising uncomplicated clutch components. This is a great advantage since the retarder device becomes connectible and disconnectable without risking that air comes into contact with the coolant, resulting in an adverse impact on other components in the vehicle with which the coolant comes into contact.

The negative pressure generator may be connected with the retarder circuit downstream as well as upstream of the workspace and also directly towards the workspace.

It is preferable for a control valve to be arranged in the control circuit downstream of the workspace in order to provide the possibility of controlling a braking torque exercised by the retarder device. It is preferred to have a check valve arranged inside the retarder circuit in connection with the control valve in order to ensure protection against backflow. This check valve may be separate from or integrated with the control valve.

In some embodiments, the negative pressure generator is connected to the retarder circuit via an inlet valve and to said coolant circuit via an exhaust conduit. Either or each of the inlet conduit and the exhaust conduit may thus need to be equipped with a check valve.

It is preferred for the negative pressure generator to be one from a group comprising: a piston cylinder pump, a vacuum container rechargeable with negative pressure, a rotation pump. These devices may be installed to act at the required speed, so that in particular the insertion of a rechargeable vacuum container, which is constantly ready and directly switchable through a valve, entails a high degree of speed in an uncomplicated manner. With the use of a rechargeable vacuum container as a negative pressure generator, the inlet conduit need not be equipped with a check valve. Neither does any exhaust conduit need to be installed.

A method according to the invention for the operation of a hydrodynamic retarder device, according to the above, is characterized by inflow of the working medium to the workspace being closed, and that the pressure in the workspace is decreased to or below the vapor pressure for the working medium and that therefore the workspace is evacuated of a liquid working medium. In other words, the workspace is thus insulated and subjected to the said negative pressure, which surprisingly quickly, nearly instantly, may be brought to result in the desired evacuation of the workspace of liquid.

Preferably, a flow of working medium to the workspace is controlled by a control valve arranged in the control circuit, so that the preferred flow of working medium from the control valve to the workspace is prevented through a check valve arranged in the control circuit in connection with the control valve.

The invention also pertains to a vehicle, comprising a retarder device according to the above.

DESCRIPTION OF DRAWINGS

The invention will not be described in further detail based on the example embodiments and with reference to the enclosed drawings, on which.

DESCRIPTION OF EXAMPLE EMBODIMENTS

Figure 1:
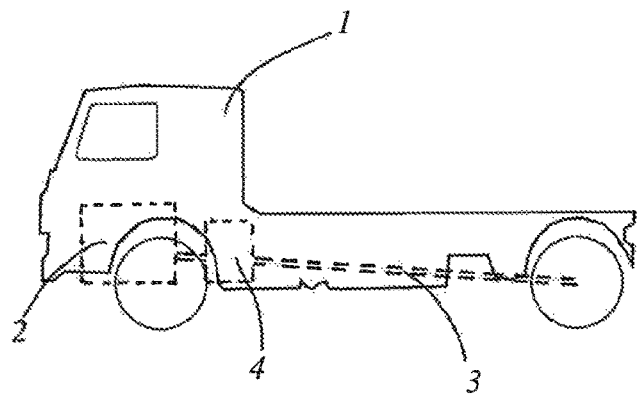
FIG. 1 shows schematically a commercial vehicle equipped with a retarder device according to the invention.

The commercial vehicle 1 shown in FIG. 1 is of the type comprising an engine 2, a driveline 3 and a retarder device 4 which may be connected and disconnected.

Figure 2:
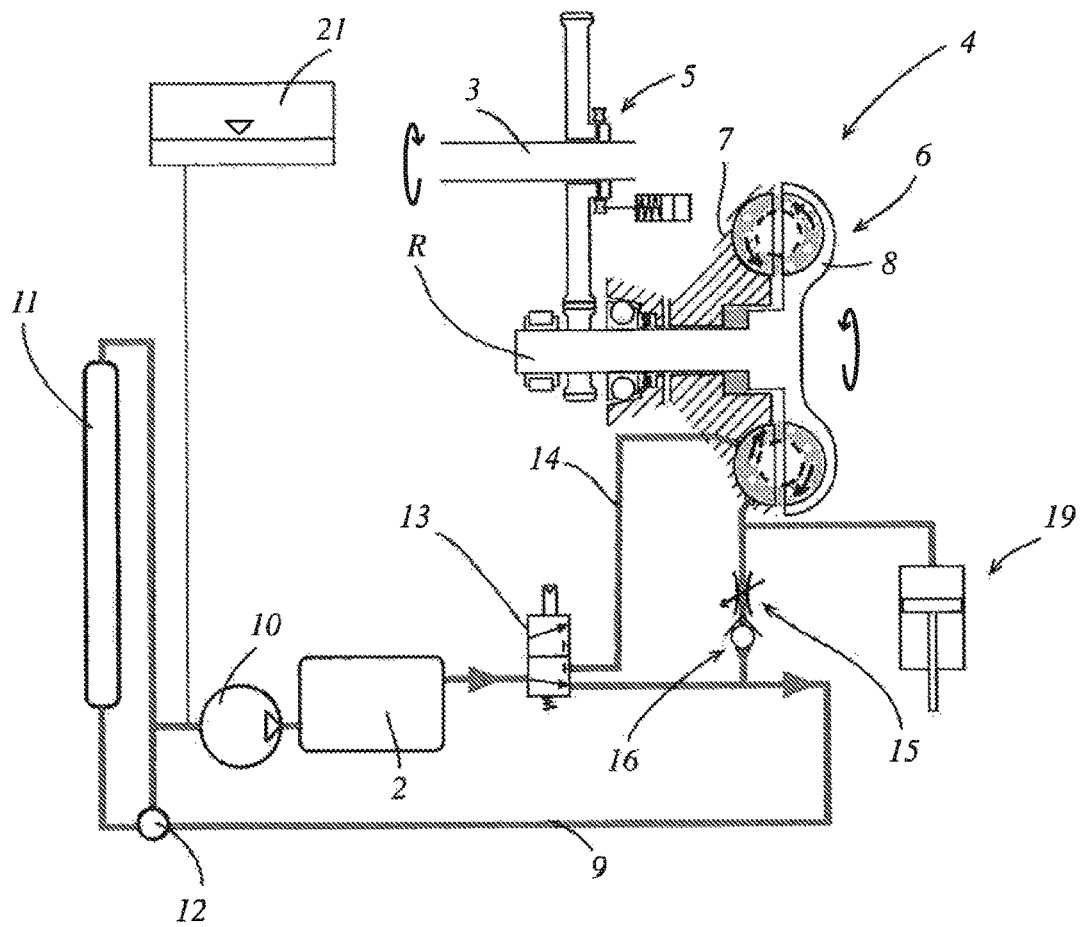
FIG. 2 shows a diagram of a retarder device according to the invention.

The basic structure of a retarder device 4 is shown in FIG. 2, where a clutch device 5 is arranged for connection and disconnection of the retarder device 4 to the vehicle's driveline 3. The retarder device 4 has a stator 7 and a rotor 8, which is rotatable around a shaft R.

Together, the stator 7 and the rotor 8 form a blade system with a workspace 6, in which more or less fluid is designed to be hurled around in order to function as a working medium in the operation of the retarder device, so that energy absorbed by the retarder device transforms into heat. This heat is cooled off by the vehicle's ordinary cooling system, which comprises a coolant circuit 9, a water pump 10, a front cooler 11, an expansion tank 21 and a thermostat 12.

A directional valve 13 inserted in the coolant circuit 9 is installed to lead coolant as a working medium to the blade system's workspace 6 and to shut off the flow to the workspace 6. From the directional valve 13, a retarder circuit 14 leads to an area in the workspace 6 where a lower pressure prevails during operation and where coolant may be added as a working medium. The retarder circuit 14 is also, for the outlet of working medium from the workspace, connected to a peripheral area of the workspace 6, in which a higher pressure may be expected during operation and where the outflow of the working medium may occur.

Downstream of the workspace 6, the retarder circuit passes through a control valve 15, with whose help the pressure in the workspace and as a result thereof the amount of working medium in the workspace is adjustable.

Further, downstream of the control valve 15, a check valve 16 is arranged which allows for a flow of the working medium from the workspace 6 but prevents flow in the opposite direction.

Downstream of the workspace in the retarder circuit 14 and upstream of the control valve 15, a negative pressure circuit is connected, which includes a negative pressure generator 19, here displayed in the form of a piston cylinder device 19.

To the extent the negative pressure generator 19 is of a type that operates with several strokes, a check valve may, where needed, be installed in its inlet conduit and its outlet conduit, respectively (not shown in the figure).

Figure 3:
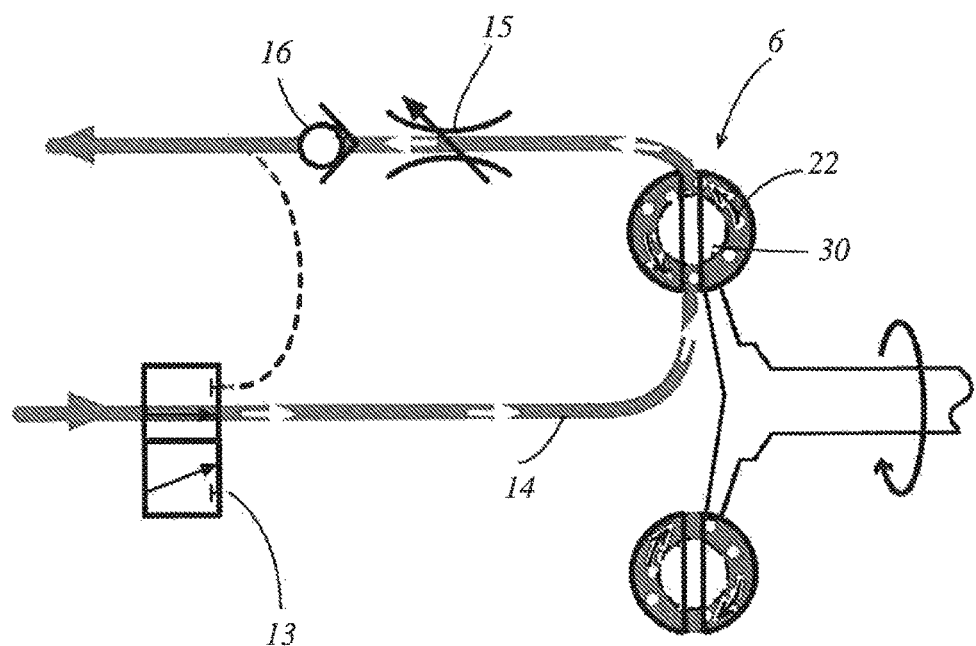
FIGS. 3 and 4 show in simplified form two operating modes for a retarder device according to the invention.

FIG. 3 illustrates an operating case which is characterized as normal braking, and wherein all available cooling water/coolant is permitted to enter as a working medium through the directional valve 13 into the retarder device's workspace 6. As indicated in FIG. 3, in this operating case a fluid amount 22 is active within the blade system, and this fluid amount will during operation be imparted a rotating movement according to the arrows inside the workspace 6.

At this operation, it is possible to control the braking torque by changing the pressure in the workspace and thus the fluid amount through adjustment of the control valve 15.

In this way, the amount of fluid that is impacted within the blade system will thus change, entailing that an inner space 30 becomes larger or smaller.

Overall, it may be said that in this operating case the maximum braking action of the retarder device may be obtained.

Figure 4:
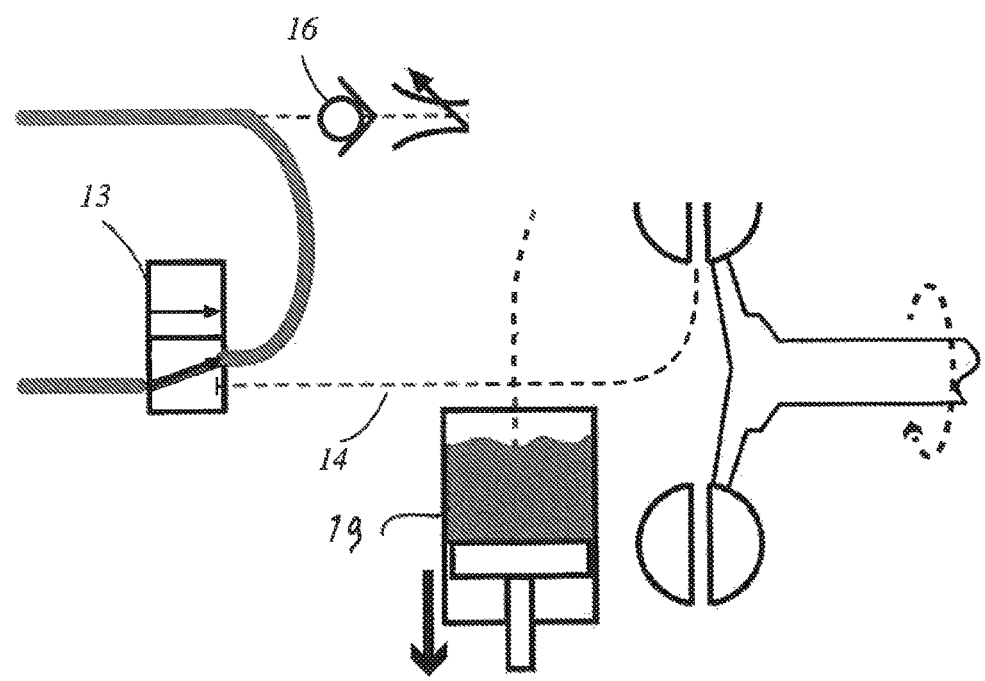

FIG. 4 illustrates an operating case where the retarder device is mechanically connected or disconnected from the vehicle's driveline. As described above, this requires low drag torque for the retarder device to avoid uncomfortable jerks.

According to the invention, such low drag torque is achieved on the one hand by disconnecting the retarder circuit 14 from the cooling water circuit, and by ensuring that the workspace 6 substantially instantly is subjected to such a negative pressure that water vapor is formed for fast evacuation of water from the workspace 6.

In other respects, the functioning of the operating case according to FIG. 4 is understood through the previous description in connection with FIG. 2.

Figure 5:
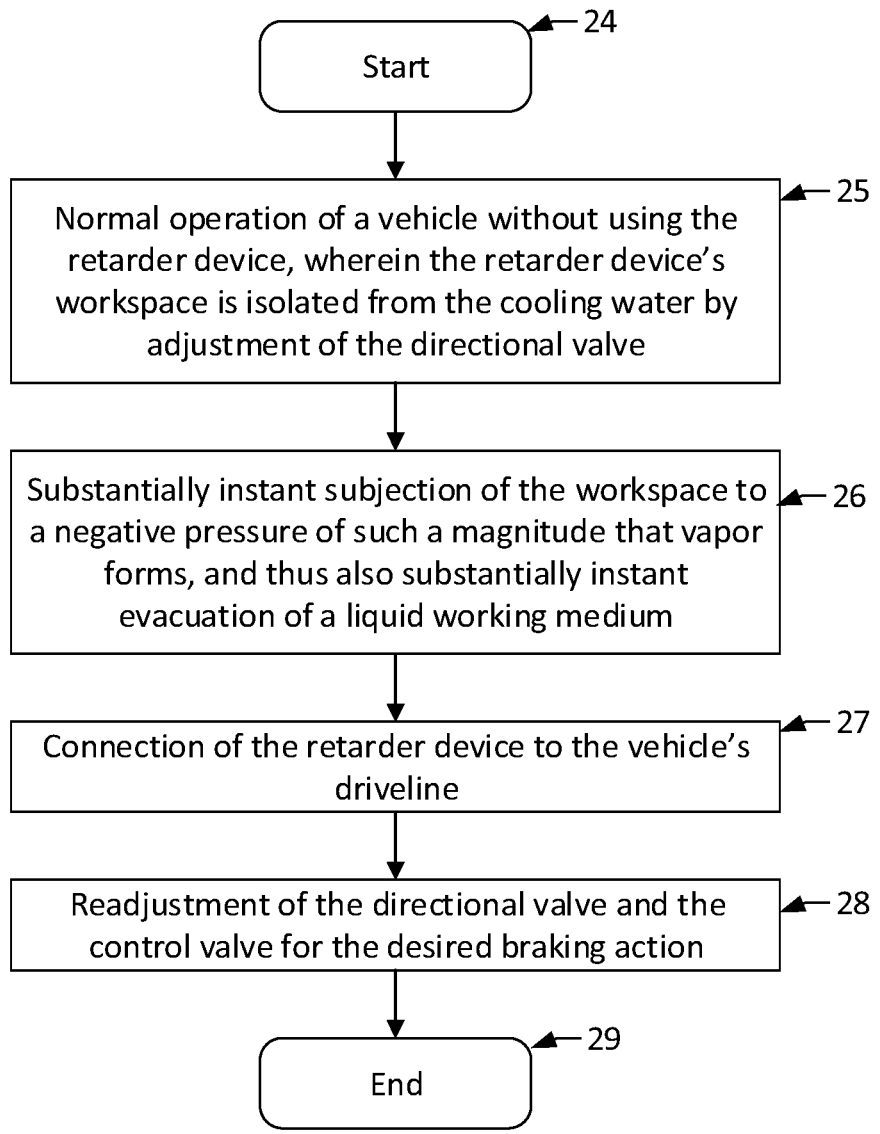
FIG. 5 shows schematically a sequence of a method according to the invention in the form of a simple block diagram.

One sequence of a method according to the invention is illustrated schematically through the block diagram in FIG. 5.

Position 24 pertains to the start of the sequence.

Position 25 pertains to normal operation of a vehicle without using the retarder device, wherein the retarder device's workspace is isolated from the cooling water by adjustment of the directional valve 13.

Position 26 pertains to substantially instant subjection of the workspace to a negative pressure of such a magnitude that vapor forms, and thus also substantially instant evacuation of a liquid working medium.

Position 27 pertains to connection of the retarder device to the vehicle's driveline.

Position 28 pertains to readjustment of the directional valve and the control valve for the desired braking action.

Position 29 pertains to the completion of the sequence.

The sequence steps may be partly in a different order than set out above.

Significant advantages are achieved thanks to the invention. One advantage is that only one single system with liquid that is to be cooled is required for the vehicle. A vehicle equipped with a retarder device according to the invention becomes therefore e.g. lighter and less costly to produce and also entails an environmental improvement compared to prior art. Since the retarder device may additionally be disconnected from the vehicle's driveline without any problems, the vehicle's driving economy is improved. Drag losses from a co-rotating retarder would otherwise be significant.

As an alternative to the negative pressure generator, shown in the drawings, other types of "suction devices" may be used, such as a fast-acting pump device. A preferred alternative is to provide a vessel which may be recharged with a negative pressure, the vessel of which is connected, where needed, to the retarder circuit.

It has become apparent that a desired negative pressure is in the range of 0.5 bar below atmospheric pressure, since the vapor pressure at normal working temperature amounts to approximately this value. Application of greater negative pressure is not ruled out, however, since this may be needed at lower temperatures because of the vapor pressure's temperature dependency.

A retarder device according to the invention may comprise a blade-equipped stator in order to, together with a blade-equipped rotor, form the blade system with its workspace. According to the invention, the retarder device may also comprise more than one blade-equipped stator interacting with corresponding more than one blade-equipped rotor to form the blade system with its workspace.

The invention claimed is:

1. A hydrodynamic retarder device for connection and disconnection to a driveline of a vehicle, wherein the retarder device comprises:
    at least one blade-equipped stator which, together with at least one blade-equipped rotor, forms a blade system with a workspace for receipt of an aqueous working medium;
    a retarder circuit connected to the workspace in order to control an inflow of working medium to the workspace, so that the retarder circuit is installed to be connected to a cooling water circuit of the vehicle;
    a clutch device for connection and disconnection of said retarder device to/from said driveline,
    wherein the retarder circuit comprises:
    one or more valve elements for shutting off the inflow of working medium to the workspace; and
    a negative pressure generator connected in the retarder circuit, which is installed to reduce the pressure in the workspace to or below a vapor pressure of the working medium, so that the workspace is thus evacuated of liquid working medium.

2. A retarder device according to claim 1, wherein a control valve is arranged in a control circuit downstream of the workspace.

3. A retarder device according to claim 2, wherein a check valve is arranged inside the control circuit in connection with the control valve.

4. A retarder device according to claim 1, wherein the negative pressure generator is connected to the retarder circuit either downstream of the workspace, upstream of the workspace, or directly to the workspace.

5. A retarder device according to claim 4, wherein the negative pressure generator is connected to the retarder circuit with an inlet conduit and to the cooling water circuit with an outlet conduit.

6. A retarder device according to claim 5, wherein the inlet conduit and/or the outlet conduit from the negative pressure generator is (are) equipped with a check valve.

7. A retarder device according to claim 1, wherein the negative pressure generator is one from a group consisting of: a piston-cylinder pump, a negative pressure container rechargeable with negative pressure, or a rotation pump.

8. A method for operation of a hydrodynamic retarder device for connection and disconnection to a driveline of a vehicle,
    wherein the retarder device comprises:
        a blade-equipped stator which, together with a blade-equipped rotor, forms a blade system with a workspace for receipt of an aqueous working medium;
        a retarder circuit connected to the workspace in order to control the inflow of working medium to the workspace, wherein the retarder circuit is installed to be connected to a cooling water circuit of the vehicle, and
        a clutch device for connection and disconnection of said retarder device to/from said driveline,
    wherein said method comprises: closing the inflow of a working medium to the workspace; and
    reducing the pressure in the workspace to or below the vapor pressure of the working medium, so that the workspace is thus evacuated of a liquid working medium.

9. A method according to claim 8 further comprising controlling a flow of working medium from the workspace using a control valve arranged in a control circuit downstream of the workspace.

10. A method according to claim 9 further comprising allowing flow of the working medium from the workspace and preventing flow in the opposite direction using a check valve arranged in the control circuit in connection with the control valve.

11. A method according to claim 8, wherein the pressure in the workspace is reduced by a connection of a negative pressure generator to the retarder circuit.

12. A method according to claim 11, wherein the pressure in the workspace is reduced by connection of one from a group consisting of: a piston-cylinder pump, a negative pressure container rechargeable with negative pressure, or a rotation pump.

13. A method according to claim 8, wherein when the pressure in the workspace is reduced to or below the vapor pressure of the working medium and the workspace has been evacuated of liquid working medium, said method comprising connecting and disconnecting the retarder device to said driveline.

14. A vehicle comprising:
a driveline; and
a hydrodynamic retarder device for connection and disconnection to the driveline, wherein the retarder device comprises:
   at least one blade-equipped stator which, together with at least one blade-equipped rotor, forms a blade system with a workspace for receipt of an aqueous working medium;
   a retarder circuit connected to the workspace in order to control an inflow of working medium to the workspace, so that the retarder circuit is installed to be connected to a cooling water circuit of the vehicle;
   a clutch device for connection and disconnection of said retarder device to/from said driveline,
   wherein
      the retarder circuit comprises one or more valve elements for shutting off the inflow of working medium to the workspace; and
      a negative pressure generator connected in the retarder circuit, which is installed to reduce the pressure in the workspace to or below a vapor pressure of the working medium, so that the workspace is thus evacuated of liquid working medium.

15. A vehicle according to claim 14, wherein a control valve is arranged in a control circuit downstream of the workspace.

16. A vehicle according to claim 15, wherein a check valve is arranged inside the control circuit in connection with the control valve.

17. A vehicle according to claim 14, wherein the negative pressure generator is connected to the retarder circuit either downstream of the workspace, upstream of the workspace, or directly to the workspace.

18. A vehicle according to claim 17, wherein the negative pressure generator is connected to the retarder circuit with an inlet conduit and to the cooling water circuit with an outlet conduit.

19. A vehicle according to claim 18, wherein the inlet conduit and/or the outlet conduit from the negative pressure generator is (are) equipped with a check valve.

20. A vehicle according to claim 14, wherein the negative pressure generator is one from a group consisting of: a piston-cylinder pump, a negative pressure container rechargeable with negative pressure, or a rotation pump.

* * * * *